(No Model.) 2 Sheets—Sheet 2.

W. WITTIG.
DUMPING DEVICE.

No. 590,637. Patented Sept. 28, 1897.

Witnesses
H. T. Dieterich
J. H. Carlwriger

Inventor
William Wittig
By his Attorneys,
C. A. Snow & Co.

THE NORRIS PETERS CO., PHOTO-LITHO., WASHINGTON, D. C.

UNITED STATES PATENT OFFICE.

WILLIAM WITTIG, OF VOSS, NORTH DAKOTA.

DUMPING DEVICE.

SPECIFICATION forming part of Letters Patent No. 590,637, dated September 28, 1897.

Application filed April 8, 1897. Serial No. 631,301. (No model.)

*To all whom it may concern:*

Be it known that I, WILLIAM WITTIG, a citizen of the United States, residing at Voss, in the county of Walsh and State of North Dakota, have invented a new and useful Dumping Device, of which the following is a specification.

This invention relates to certain improvements in dumping devices, such as are especially adapted for tilting wagons, cars, and the like into dumping position, so that the contents may be conveniently and quickly discharged; and the object of the invention is to provide a device of this character of a simple and inexpensive nature which shall be provided with simple and convenient means for holding it locked when the support whereon the wagon, car, or the like is in its raised or normal horizontal position.

The invention consists in a device of this character comprising a pivoted support for the wheels of the wagon or car, and operating devices for moving said support, and means actuated by said operating devices for locking the pivoted support against movement when in its raised position.

The invention also contemplates certain novel features of the construction and arrangement of the various parts of the improved dumping device whereby certain important advantages are attained and the device is made simpler, cheaper, and otherwise better adapted for use, all as will be hereinafter fully set forth.

The novel features of the invention will be carefully defined in the claims.

In order that my improvements may be the better understood, I have shown in the accompanying drawings a dumping device constructed in accordance with my invention, in which—

Figure 1:
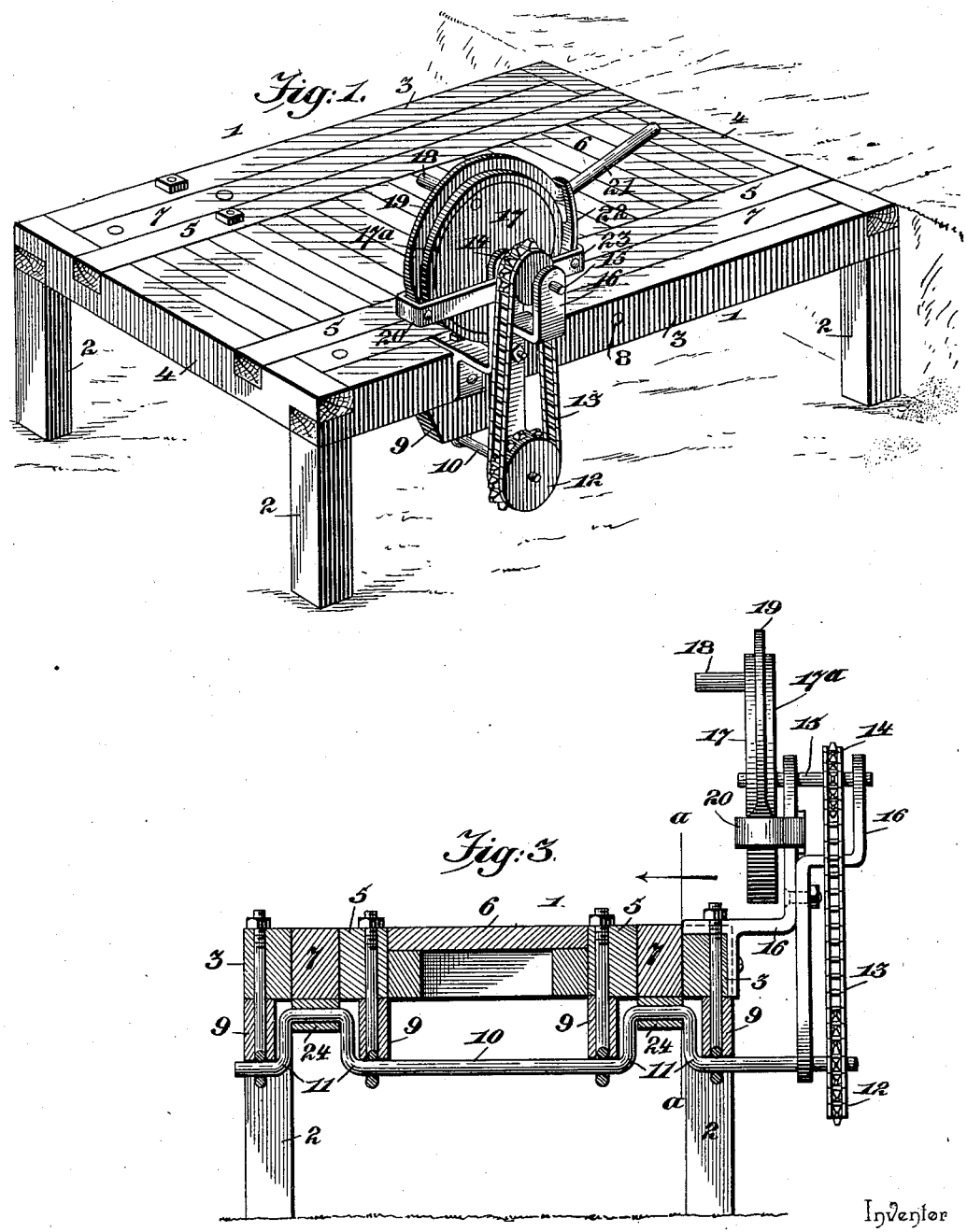
Figure 2:
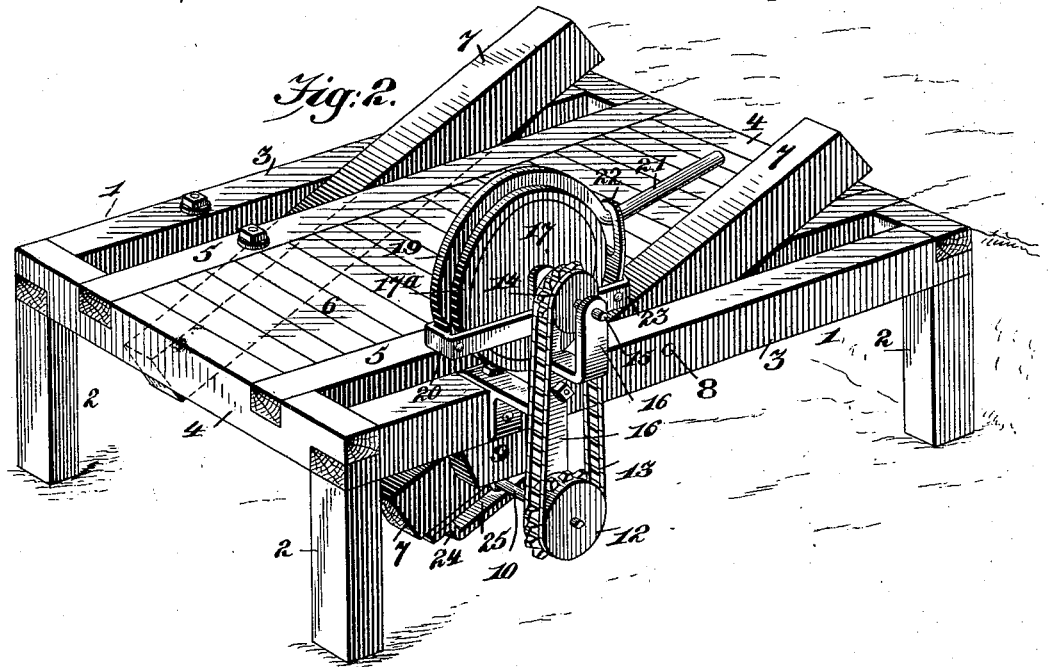
Figure 4:
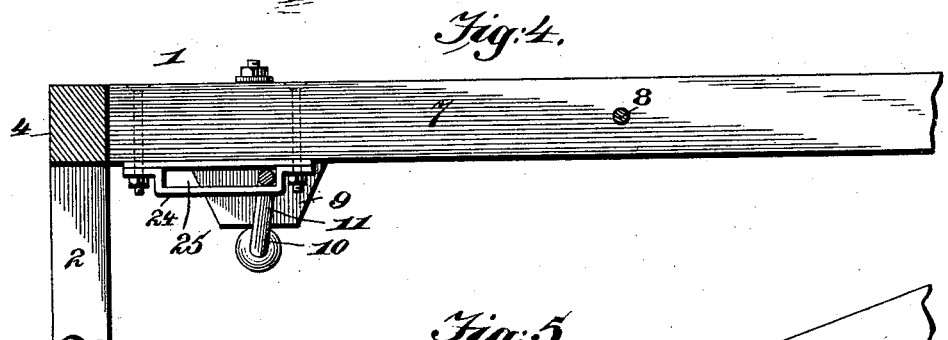
Figure 5:
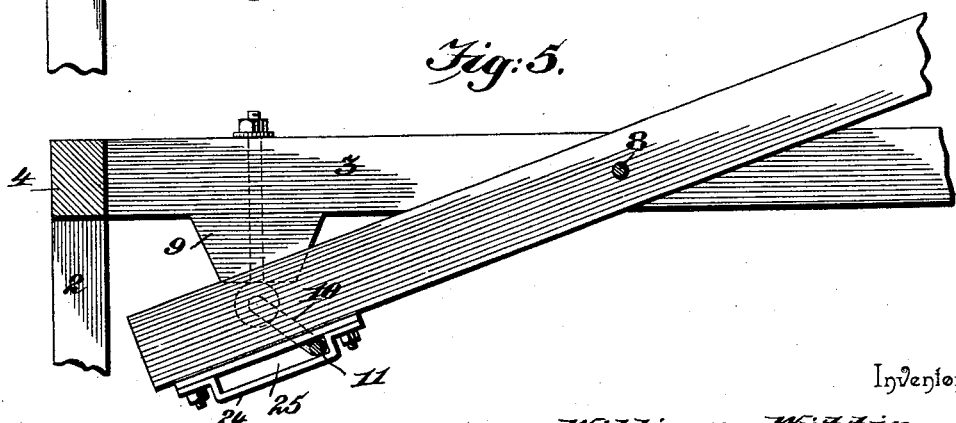

Figure 1 is a perspective view showing the device with its pivoted supports in raised position. Fig. 2 is a similar view, the supports being shown in lowered or tilted position. Fig. 3 is a sectional view taken transversely through the device. Fig. 4 is a sectional view taken longitudinally through the device in the plane indicated by the line *a a* in Fig. 3. Fig. 5 is a view similar to Fig. 4, but showing the parts in their reverse position.

In the drawings, 1 indicates a platform supported on standards or uprights 2 and formed of a framing comprising outer longitudinal beams 3, connected at their ends by cross-beams 4. Between the outer longitudinal beams 3 are arranged other inner longitudinal beams 5, between which is arranged a track 6, which may be formed of transverse planks, as shown in Figs. 1 and 2.

Between the respective inner and outer beams 5 and 3, at opposite sides of the platform, are arranged the tilting supports 7 7, which are pivoted by means of bolts or pins 8, extending through them and through the beams 3 and 5, between which they are arranged, and the rear ends of said supports are adapted to be lowered below the platform 1, as shown in Fig. 2, so as to dump the contents of the wagon or car from the rear end of the platform, as will be readily understood.

The under side of each of the inner and outer beams 5 and 3 is provided at its rear end with a bearing-block 9, and the bearing-blocks 9 are in line with each other, so as to receive a shaft 10, extending transversely across the rear end of the platform on the under side thereof, the said shaft being provided at each side of the platform with a crank 11, bent in it, and each crank being arranged between the adjacent beams 3 and 5 and being connected to the under side of the support 7 between said beams. The cranks 11 are similarly arranged, and it will be seen that when the shaft 10 is turned the tilting supports will be raised or lowered correspondingly as the shaft is moved in one direction or the other, and in order to actuate the shaft 10 I provide the same with a sprocket-wheel 12 at one end, over which wheel extends a link or chain belt 13, which extends up outside the platform 1 and over a sprocket-wheel 14, mounted on a shaft 15, held in bearings in a bracket 16, secured to the side of the platform 1 and having an arm extending down and forming a bearing for the end of the shaft 10.

On the shaft 15 is a crank-disk 17, having a handle 18, by means of which the shaft may be turned, and on the periphery of said crank-disk is adapted to bear a curved brake-shoe 19 concentric therewith, the said shoe being pivoted at one end to an arm 20 of the bracket 16 and having its other end bent as shown at 21 to form a handle extending radially away from the crank-disk and passing through a slotted and curved guide 22, secured to an arm 23, also projecting from the bracket 16. As shown in the drawings, the crank-disk is provided with a rim or outer portion 17ª, which may, if desired, be formed of wood or other material whereon the brake-shoe 19 is adapted to bear frictionally. By this construction it will be seen that the movement of the shaft 15 is communicated by means of the chain-gearing to the shaft 10 and to the connection of said shaft 10 with a tilting support 7. The movement of said shaft will be communicated to the said supports, so as to raise and lower the wagon or car out of or into dumping position. To connect the cranks 11 of the shaft 10 to the supports 7, I provide each support 7 with a bearing piece or bracket 24, secured to its under side and provided with a slotted opening 25, through which the crank passes.

To limit the movement of the shaft 10 and permit of locking the tilting supports 7 by the continued movement of the said shaft, I make the slotted openings 25 of such a length and locate them in such position that when the tilting supports are in their raised position, as shown in Figs. 1 and 4, one end of each of the said slotted openings stands just beyond a vertical line passing through the shaft 10, said end of the opening being at a less distance from such vertical line than the throw of the crank 11, so that after the supports 7 have been raised the continued movement of the shaft 10 will act to throw the crank 11 past the center and engage it with the end of the opening 25, which forms a stop, so that further movement of the parts in that direction is prevented and the tilting supports are securely held in their raised position until the crank-disk and other parts are moved in the reverse direction. When the tilting supports are in their lowest position, as shown in Figs. 2 and 5, the length of the slotted openings 25 will again serve to limit the parts and stop the actuating devices.

In operation the car or wagon to be dumped is driven upon the platform 1, with the wheels thereof resting upon the pivoted supports 7, which are held in their raised positions, as shown in Figs. 1 and 4, by means of the locking devices above described, and when the car or wagon is in position upon the platform the crank-disk is turned so as to throw the cranks on the shaft 10 past the center line of said shaft, so as to permit the supports 7 to fall by gravity, the brake-strap which engages with the periphery of the crank-disk being employed to lessen the shock upon the parts when the supports are at their lowest position. After the wagon or car has been dumped the crank-disk will be moved in the opposite direction, so as to swing the cranks 11 until they are in engagement with the ends of the slots 25, the supports being in this way brought to their raised position, so as to permit the car or wagon to be withdrawn.

From the above description it will be seen that the improved device is of an extremely simple and inexpensive construction and is especially well adapted for use, since it permits of automatically locking the tilting supports whereon the wheels of the wagon or car to be dumped rest, the locking devices being actuated by the continued movement of the devices by means of which the said supports are raised and lowered; and it will also be seen from the above description that the invention is susceptible of some modification without material departure from its principles and spirit, and for this reason I do not wish to be understood as limiting myself to the precise form and arrangement of the various parts herein set forth.

What I claim is—

1. The combination of tiltable supports, a cranked shaft operatively connected to said tiltable supports, and a power mechanism connected to said cranked shaft to rotate the same; said cranked shaft arranged to hold the tiltable supports in locked positions either when they are raised or lowered, as and for the purposes described.

2. The combination with tiltable supports, of a cranked shaft having slidable connections with said supports and arranged to lock the same either when raised or lowered, a power mechanism geared to said shaft, and a friction brake device connected with said power mechanism to control the tiltable supports through said power mechanism and the cranked shaft, as and for the purposes described.

3. The combination with a suitable framing, and with tiltable supports thereon, of elongated bracket-plates carried by said tiltable supports, a double-cranked shaft journaled on the framing and having its cranks slidably fitted in said bracket-plates, which serve to limit the play of said cranks and coact therewith to lock the shaft and the tiltable supports, and a power mechanism connected to said shaft, as and for the purposes described.

4. The combination with tiltable supports, of a crank-shaft operatively connected therewith, a power-shaft geared to the crank-shaft, a friction brake-disk mounted on said power-shaft, and a brake-band fitted to said brake-disk, whereby the descent of the tiltable supports, and the load thereon, may be controlled to ease the shock or jar on the operating elements of the dumping device, as set forth.

5. A dumping device comprising a pivoted support, a rotative shaft having a crank loosely engaging said support and adapted to move the same, means for turning the shaft to raise the support, and a stop carried by the support to stop said crank against movement and hold the support against movement when in its raised position, said stop being arranged to be engaged by the crank when the crank is moved past a vertical line extending through the axis of the shaft, substantially as set forth.

6. A dumping device comprising a pivoted support, a rotative crank-shaft having slotted engagement with said support, and means for operating the shaft, the slot with which the crank engages being of such a length that the end thereof is engaged by the crank when the support has been raised to hold said support against being lowered, substantially as set forth.

7. A dumping device comprising a pivoted support, a rotative shaft provided with a crank having slotted engagement with the support, a stop to be engaged by the crank to hold the support against movement when in its raised position, and means to operate said shaft, substantially as set forth.

8. A dumping device comprising a pivoted support, a rotative shaft provided with a crank having slotted engagement with the support, a stop carried by the support to be engaged by the crank to hold the crank against movement when the support is in its raised position, a shaft arranged above the support and geared to the first-mentioned shaft, a crank-disk on the shaft, and a brake to engage said crank-disk, substantially as set forth.

In testimony that I claim the foregoing as my own I have hereto affixed my signature in the presence of two witnesses.

WILLIAM WITTIG.

Witnesses:
BIRDIE THOMSON,
AUGUST ZUELSDORF.